United States Patent
Shihaku

(10) Patent No.: US 12,539,760 B2
(45) Date of Patent: Feb. 3, 2026

(54) METHOD OF ADJUSTING VEHICLE DISPLAY DEVICE, AND VEHICLE DISPLAY DEVICE

(71) Applicant: YAZAKI CORPORATION, Tokyo (JP)

(72) Inventor: Jun Shihaku, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 214 days.

(21) Appl. No.: 18/451,747

(22) Filed: Aug. 17, 2023

(65) Prior Publication Data

US 2024/0066989 A1    Feb. 29, 2024

(30) Foreign Application Priority Data

Aug. 25, 2022    (JP) .................................. 2022-133745

(51) Int. Cl.
*B60K 35/233*    (2024.01)
*B60K 35/235*    (2024.01)

(52) U.S. Cl.
CPC .......... *B60K 35/233* (2024.01); *B60K 35/235* (2024.01); *B60K 2360/334* (2024.01)

(58) Field of Classification Search
CPC ... B60K 35/00; B60K 35/23; B60K 2360/334
See application file for complete search history.

(56) References Cited

U.S. PATENT DOCUMENTS

| | | | |
|---|---|---|---|
| 9,939,638 B2 * | 4/2018 | Yagi | H04N 9/3185 |
| 2005/0073594 A1 * | 4/2005 | Tagawa | H04N 5/772 |
| | | | 348/231.2 |
| 2017/0230628 A1 * | 8/2017 | Ichikawa | H04N 9/3194 |
| 2017/0293140 A1 * | 10/2017 | Cai | B60K 35/60 |
| 2020/0269696 A1 * | 8/2020 | Banno | H04N 9/3194 |
| 2022/0319365 A1 * | 10/2022 | Tsuji | G09G 3/002 |

FOREIGN PATENT DOCUMENTS

| | | |
|---|---|---|
| JP | 2013-218346 A | 10/2013 |
| JP | 2021-15166 A | 2/2021 |

* cited by examiner

*Primary Examiner* — Scott A Browne
*Assistant Examiner* — Izcalli Rios-Aguirre
(74) *Attorney, Agent, or Firm* — KENEALY VAIDYA LLP

(57) ABSTRACT

A method of adjusting a vehicle display device includes a process of calculating a first correction value by performing a first inspection on a vehicle display device and writing the same in a nonvolatile memory, and a process of calculating a second correction value by performing a second inspection and writing the same in the nonvolatile memory. In the first inspection, the vehicle display device is installed on an inspection table and projects an image on a windshield for inspection, the first correction value is calculated based on the positional displacement in an image horizontal direction at a time of changing, in a vertical direction, a projection position of the image. In the second inspection, the vehicle display device projects an image on a windshield, the second correction value is calculated based on the positional displacement in the image horizontal direction at a time of changing.

3 Claims, 13 Drawing Sheets

METHOD OF ADJUSTING VEHICLE DISPLAY DEVICE, AND VEHICLE DISPLAY DEVICE

CROSS-REFERENCE TO RELATED APPLICATION(S)

The present application claims priority to and incorporates by reference the entire contents of Japanese Patent Application No. 2022-133745 filed in Japan on Aug. 25, 2022.

BACKGROUND OF THE INVENTION

1. Field of the Invention

The present invention relates to a method of adjusting a vehicle display device, and a vehicle display device.

2. Description of the Related Art

Conventionally, there is a technology of adjusting a display state of a virtual image. Japanese Patent Application Laid-open No. 2013-218346 discloses a method of manufacturing a head-up display device that corrects positional displacement by changing a position of an image output device in each of an X direction and a Y direction along a screen of the image output device and adjusting a relative position between the image output device and an optical system.

In the vehicle display device, it is desirable that the positional displacement in the image horizontal direction can be efficiently adjusted. For example, in a case where the positional displacement is adjusted by a mechanical means such as adjusting a component position or an installation state of a housing, an operation procedure in an adjusting process tends to be complicated. In the vehicle display device, it is desirable that the positional displacement in the image horizontal direction can be efficiently adjusted.

SUMMARY OF THE INVENTION

An object of the present invention is to provide a method of adjusting a vehicle display device, and a vehicle display device capable of efficiently adjusting positional displacement in an image horizontal direction.

In order to achieve the above mentioned object, in a method of adjusting a vehicle display device according to one aspect of the present invention, the method includes processes of: calculating a first correction value by performing a first inspection on the vehicle display device capable of changing a projection position of an image on a windshield in a vertical direction, and writing the first correction value in a nonvolatile memory of the vehicle display device; and calculating a second correction value by performing a second inspection on the vehicle display device, and writing the second correction value in the nonvolatile memory of the vehicle display device, wherein the first correction value and the second correction value are values that allow a display device of the vehicle display device to correct a display position in an image horizontal direction in order to reduce positional displacement in the image horizontal direction from a regular position, in the first inspection, the vehicle display device is installed on an inspection table and projects an image on a windshield for inspection, and the first correction value is calculated on a basis of positional displacement in the image horizontal direction at a time of changing, in the vertical direction, the projection position of the image on the windshield for inspection, in the second inspection, the vehicle display device is installed in a vehicle and projects an image on the windshield of the vehicle, and the second correction value is calculated on a basis of positional displacement in the image horizontal direction at a time of changing, in the vertical direction, a projection position of the image on the windshield of the vehicle, and in the second inspection, the display device displays an image in which the display position is corrected with the first correction value.

In order to achieve the above mentioned object, a vehicle display device according to another aspect of the present invention includes an image display unit mounted on a vehicle, the image display unit being capable of changing a projection position of an image on a windshield in a vertical direction, wherein the image display unit includes: a display device that displays an image; a mirror that reflects display light of the image toward the windshield; a nonvolatile memory that stores a first correction value and a second correction value; and a controller configured to control the display device, the controller corrects a display position in an image horizontal direction on the display device on a basis of the first correction value and the second correction value according to the projection position in the vertical direction of the image on the windshield, the first correction value is a correction value based on an inspection result for the image display unit alone not mounted on the vehicle, and the second correction value is a correction value based on an inspection result for the image display unit mounted on the vehicle, and based on an inspection result for the image display unit in which the display position is corrected with the first correction value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a method of adjusting a vehicle display device, and a vehicle display device according to an embodiment of the present invention are described in detail with reference to the drawings. Note that, the present invention is not limited by the embodiment. Components in the following embodiment include the components easily assumed by those skilled in the art or substantially identical components.

EMBODIMENT

Figure 1:
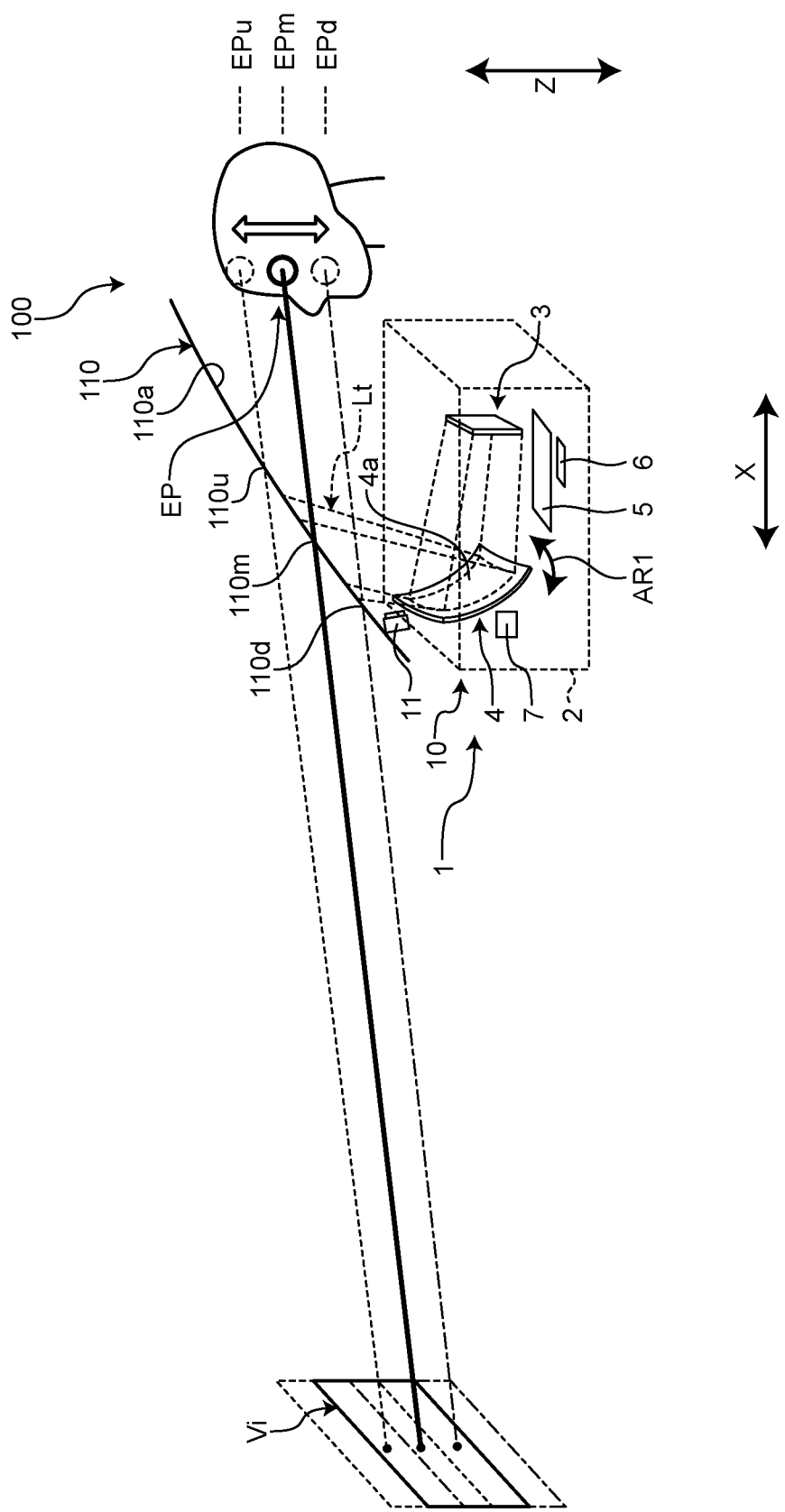
FIG. 1 is a diagram illustrating a vehicle display device according to an embodiment.
Figure 2:
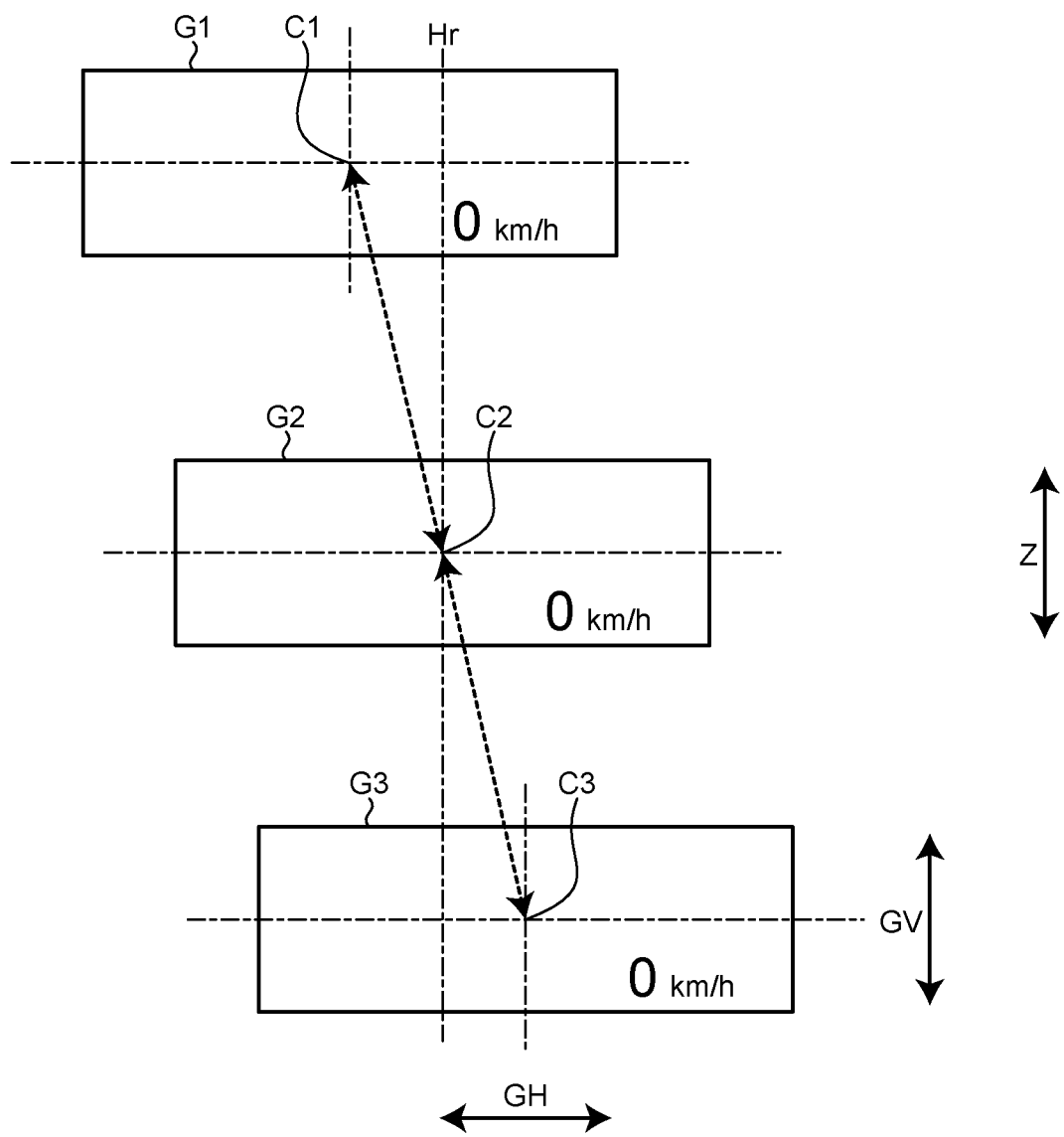
FIG. 2 is an explanatory diagram of positional displacement in an image horizontal direction.
Figure 3:
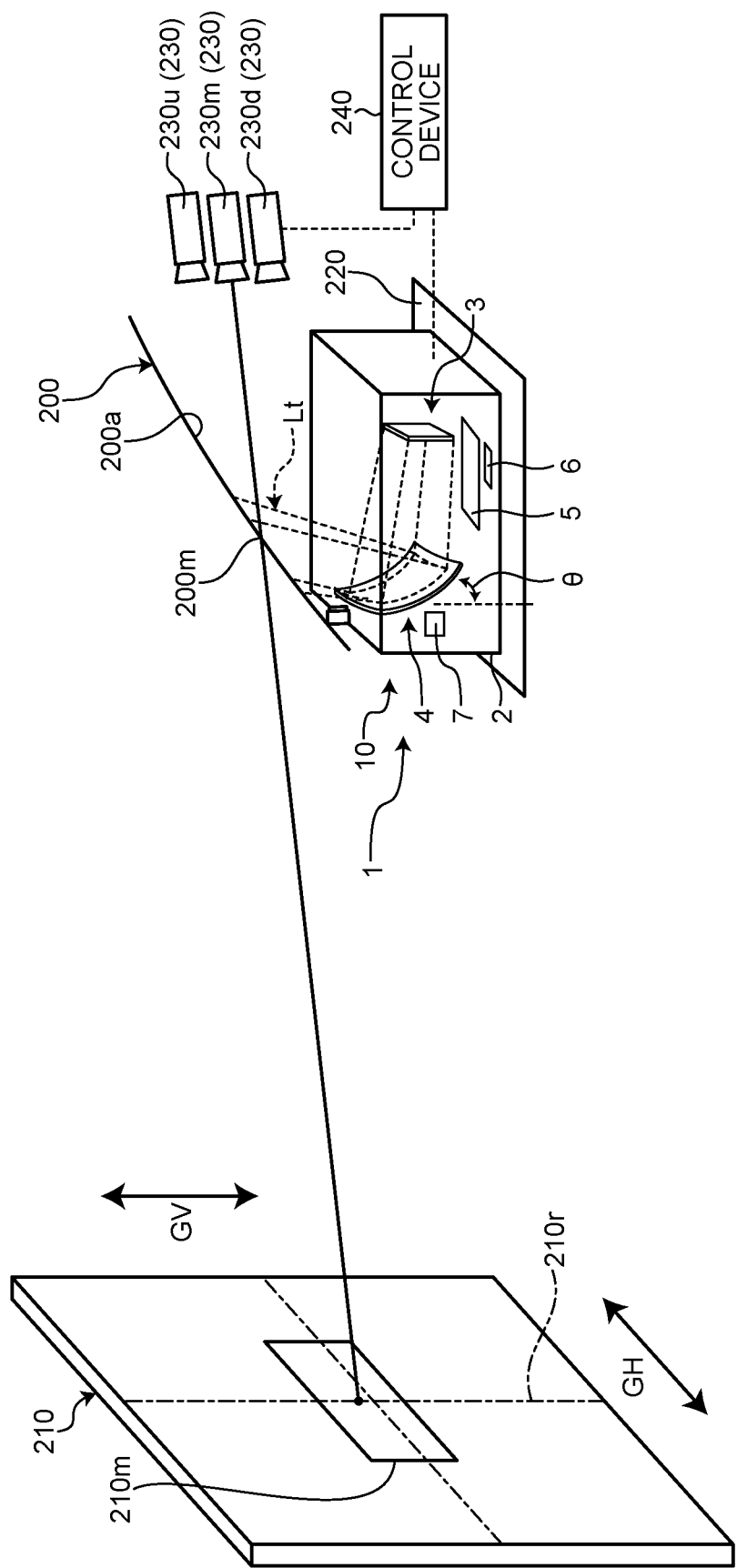
FIG. 3 is an explanatory diagram of a first adjusting process of the embodiment.
Figure 4:
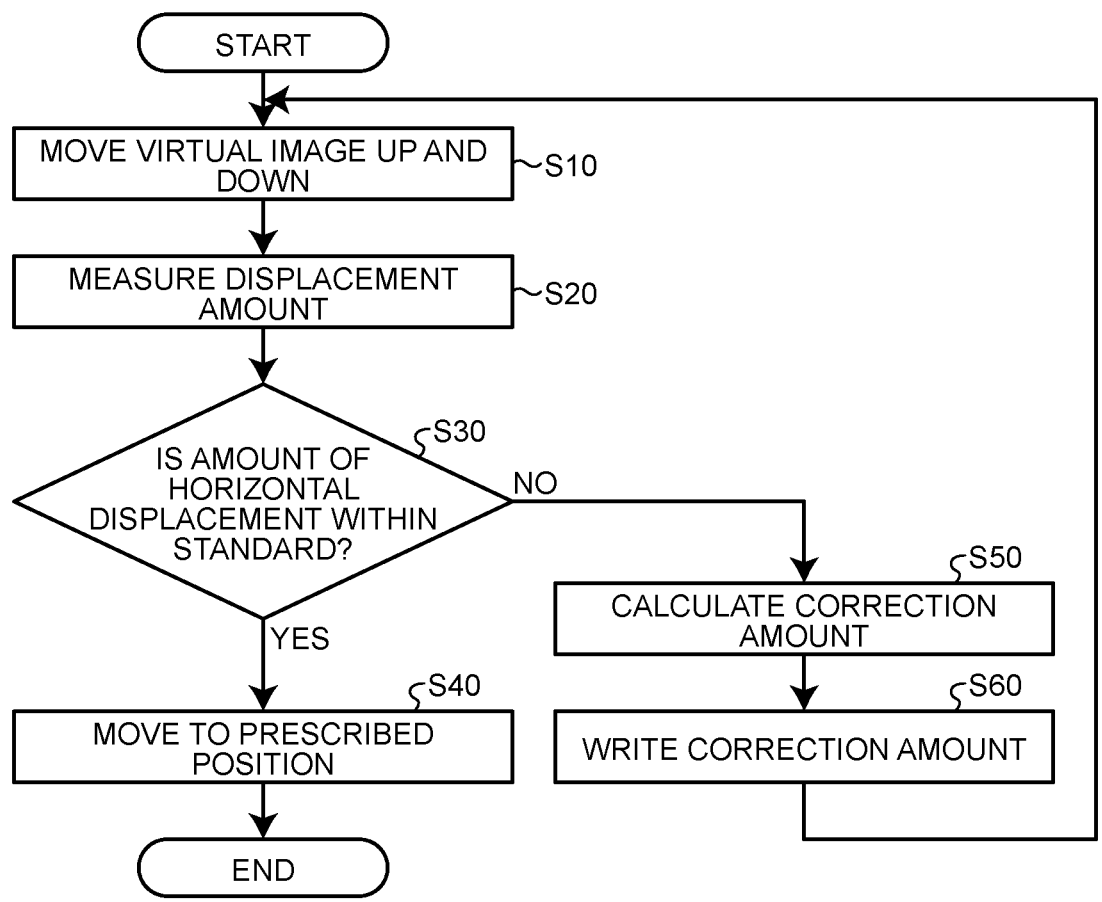
FIG. 4 is a flowchart regarding an adjusting process of the embodiment.
Figure 5:
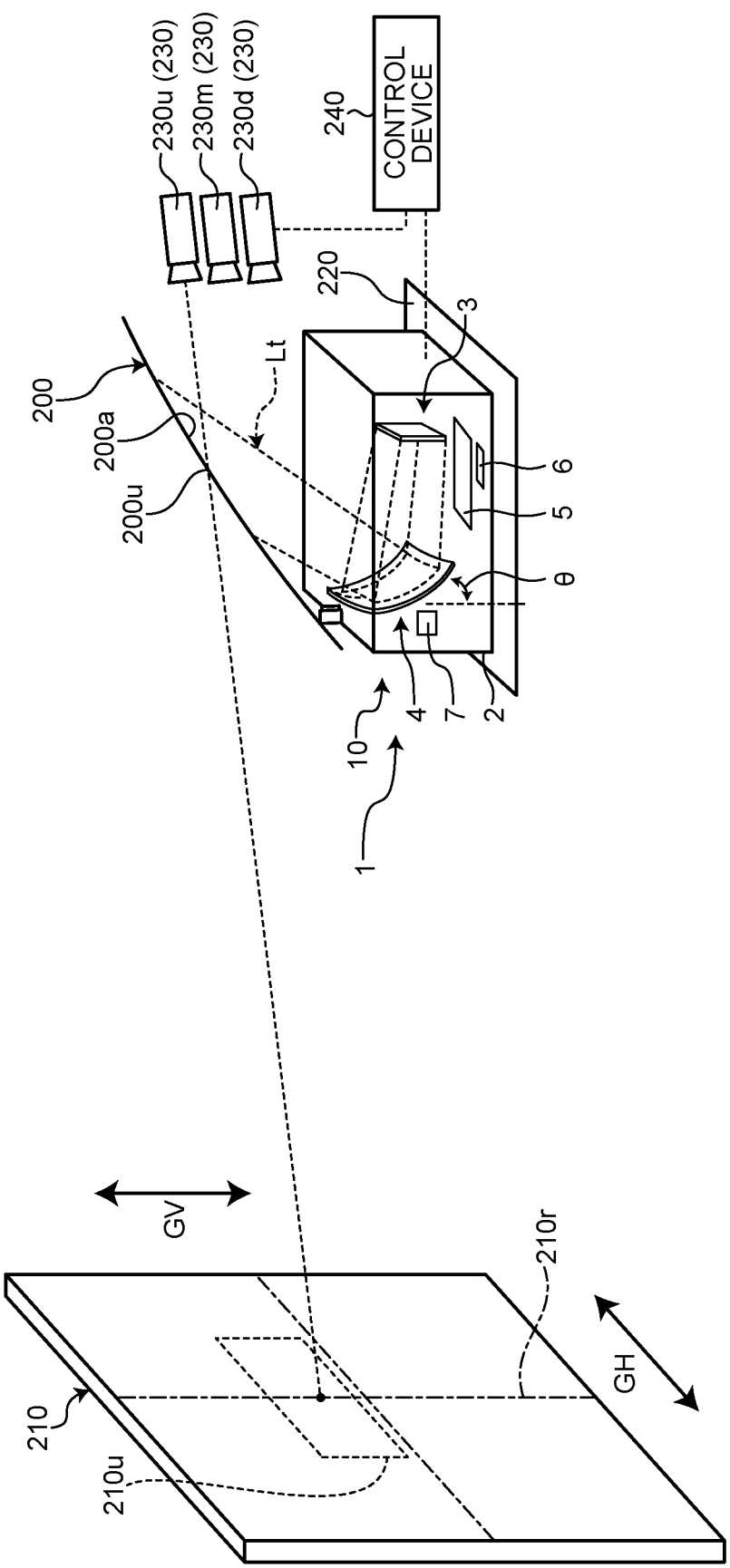
FIG. 5 is an explanatory diagram of a first adjusting process of the embodiment.
Figure 6:
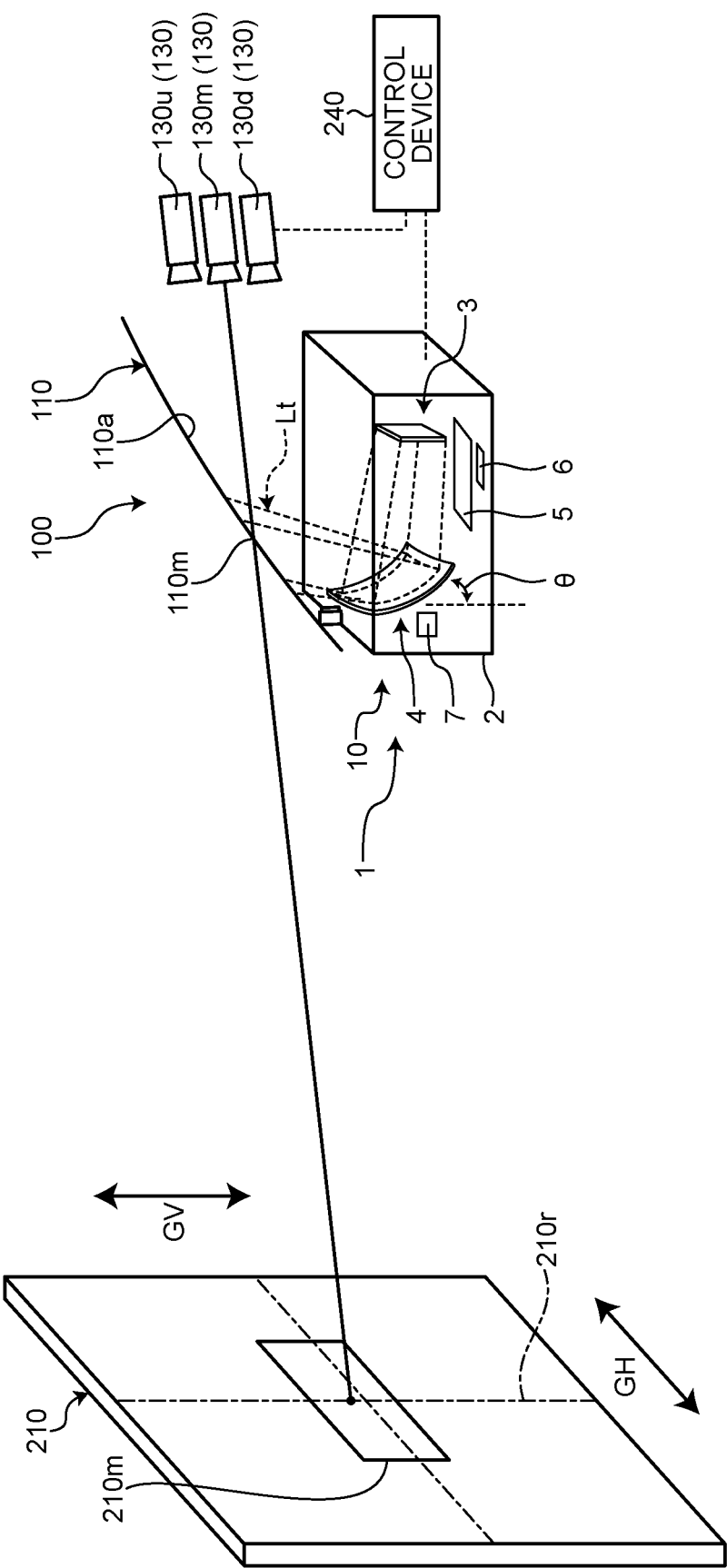
FIG. 6 is an explanatory diagram of a second adjusting process of the embodiment.
Figure 7:
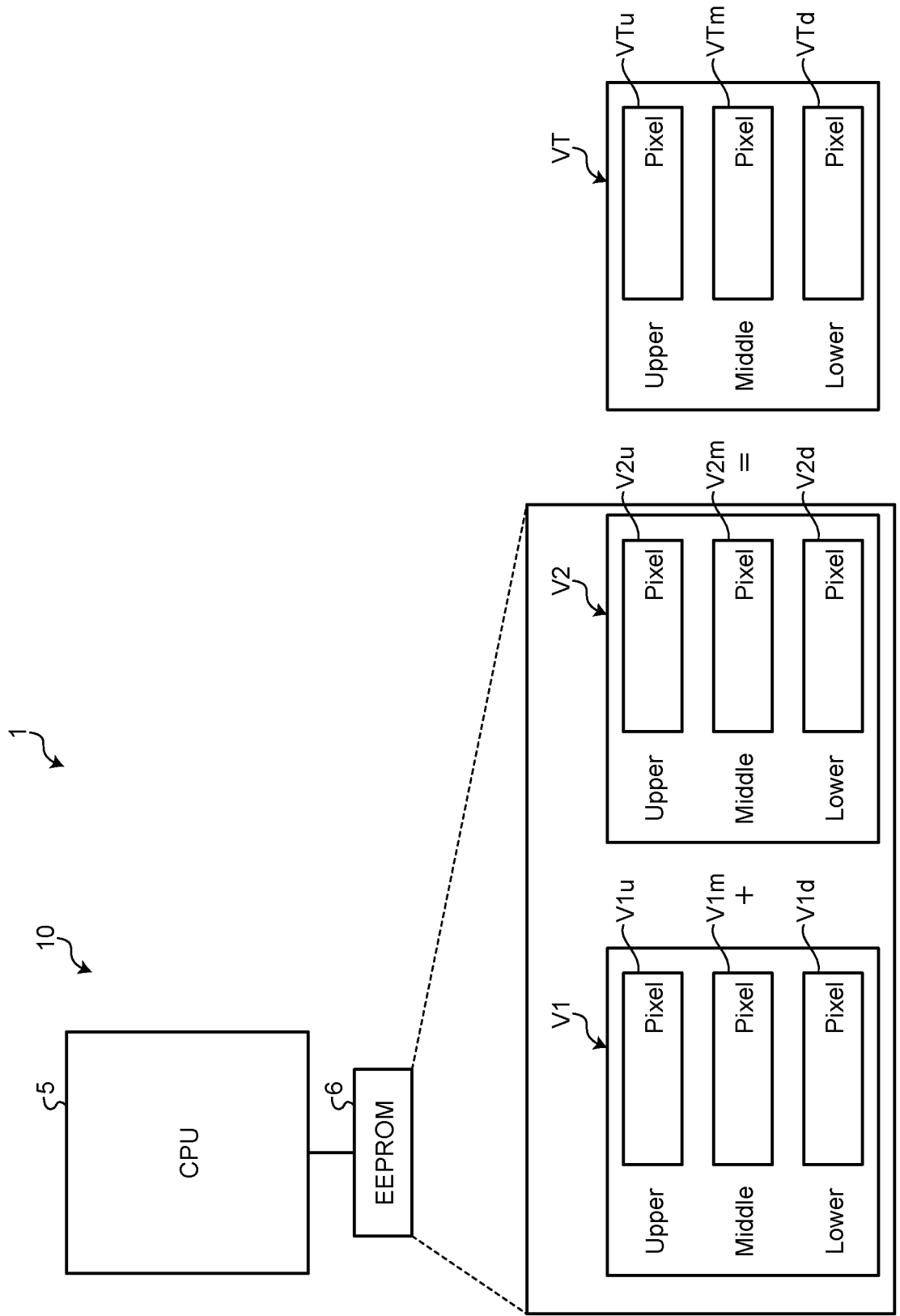
FIG. 7 is an explanatory diagram of a first correction value and a second correction value of the embodiment.
Figure 8:
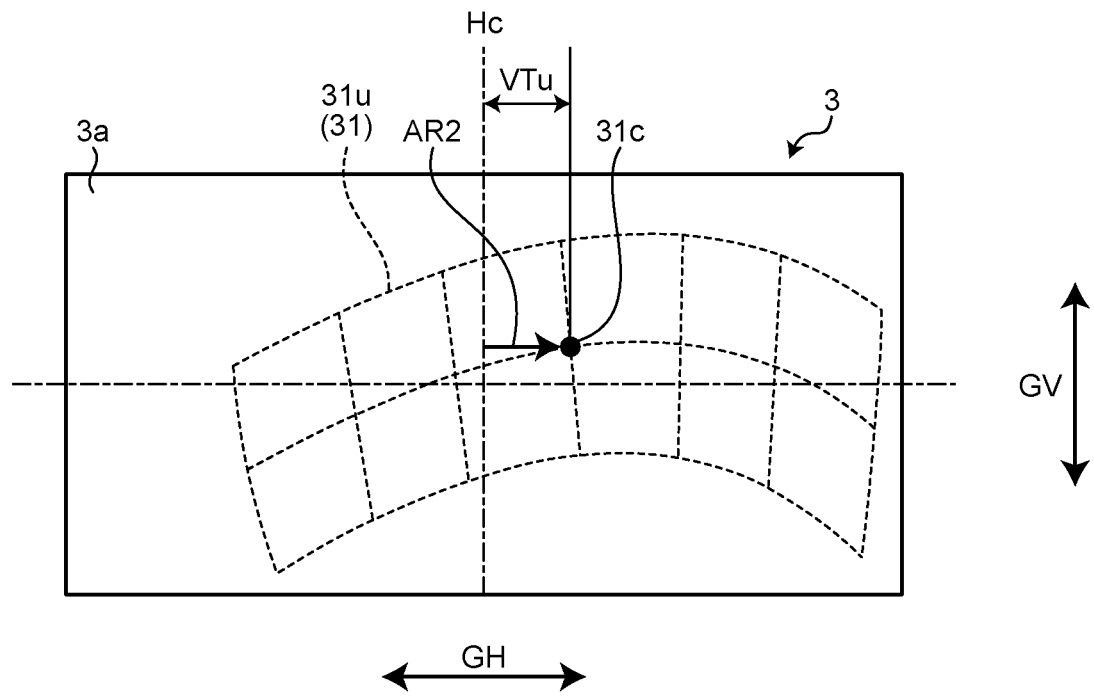
FIG. 8 is a diagram illustrating a display area of the embodiment.
Figure 9:
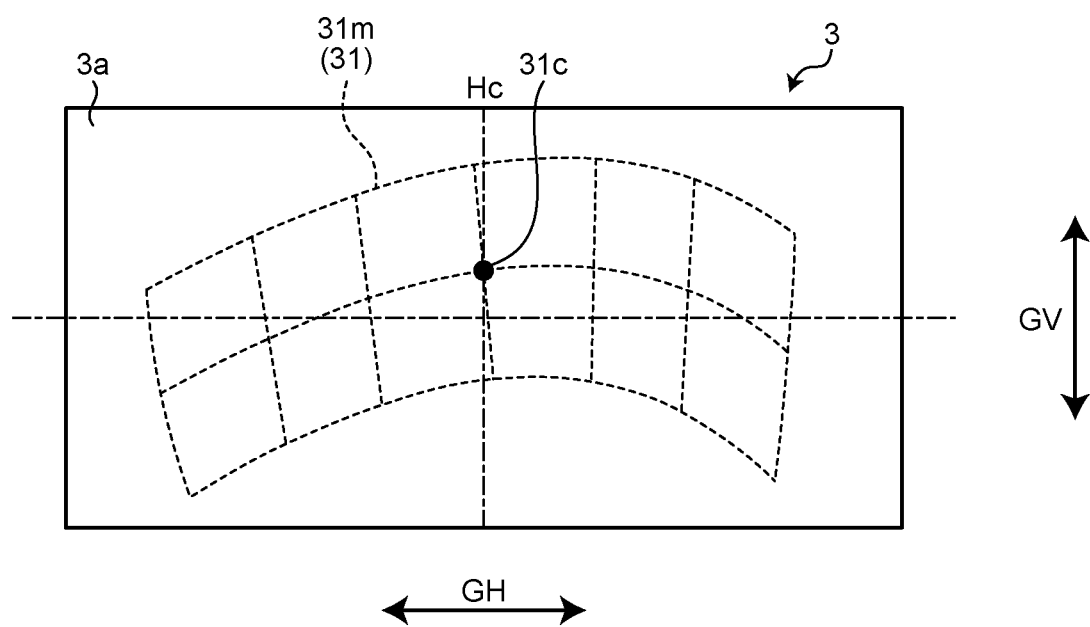
FIG. 9 is a diagram illustrating a display area of the embodiment.
Figure 10:
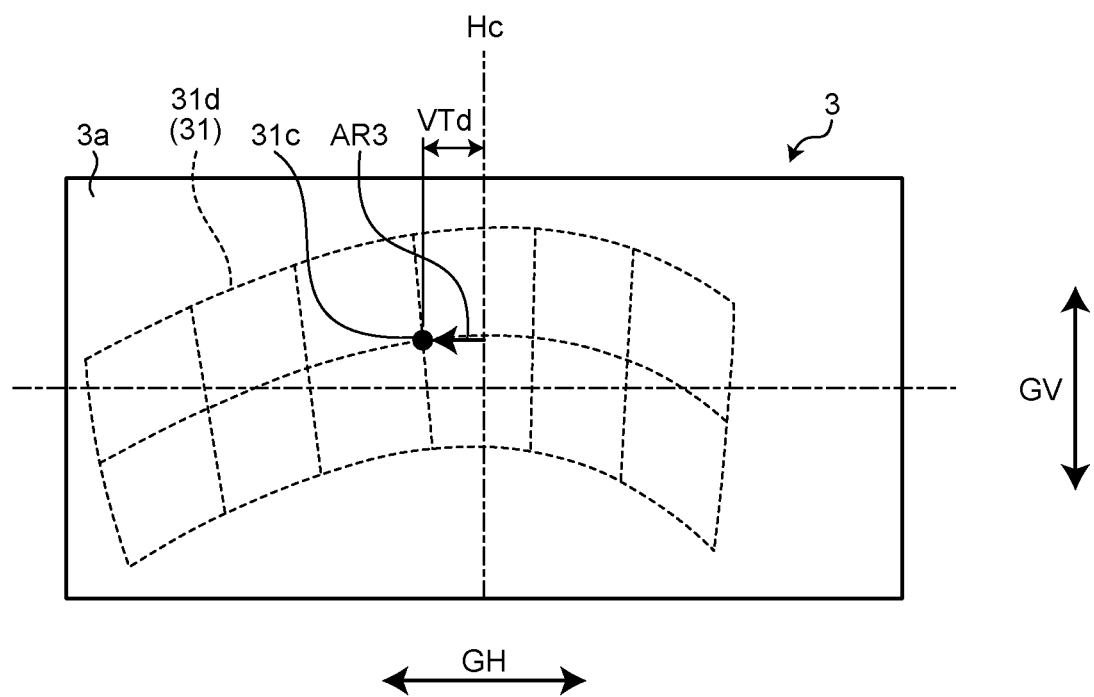
FIG. 10 is a diagram illustrating a display area of the embodiment.
Figure 11:
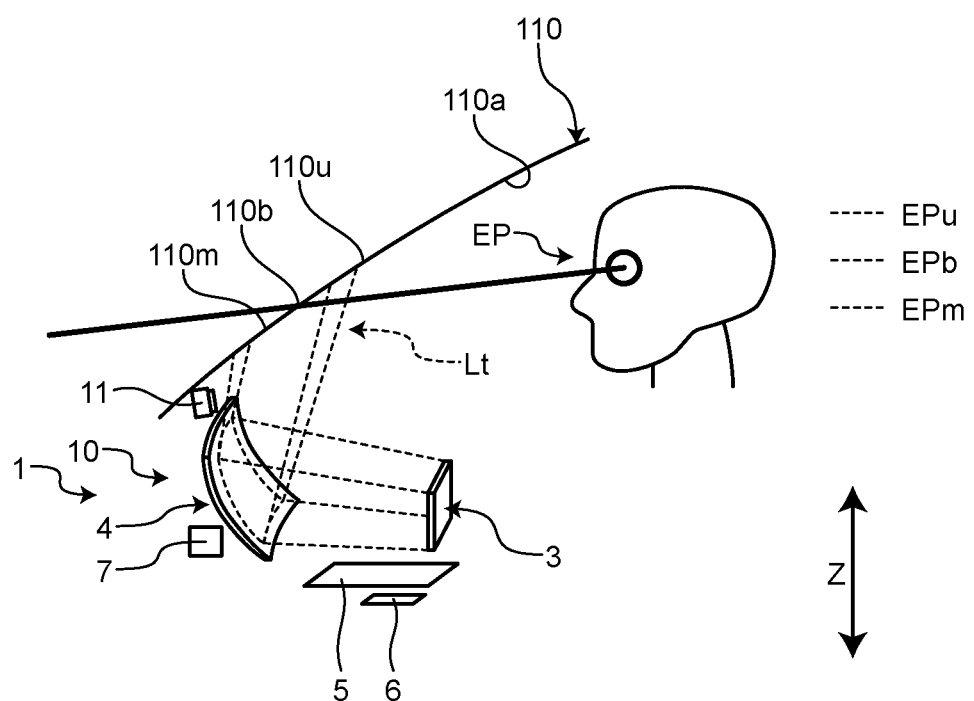
FIG. 11 is an explanatory diagram regarding adjustment in the display position.
Figure 12:
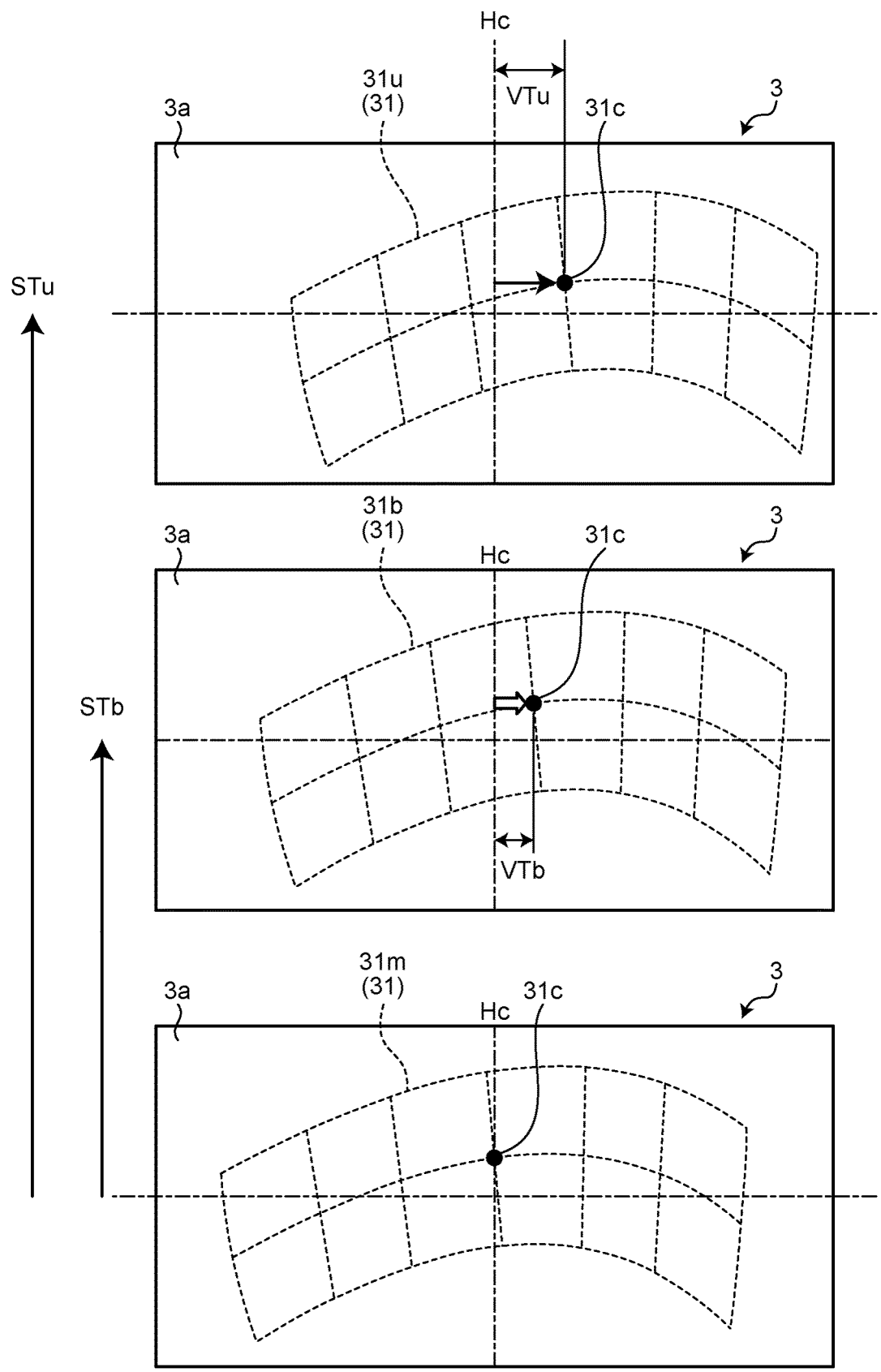
FIG. 12 is an explanatory diagram regarding adjustment in the display position.
Figure 13:
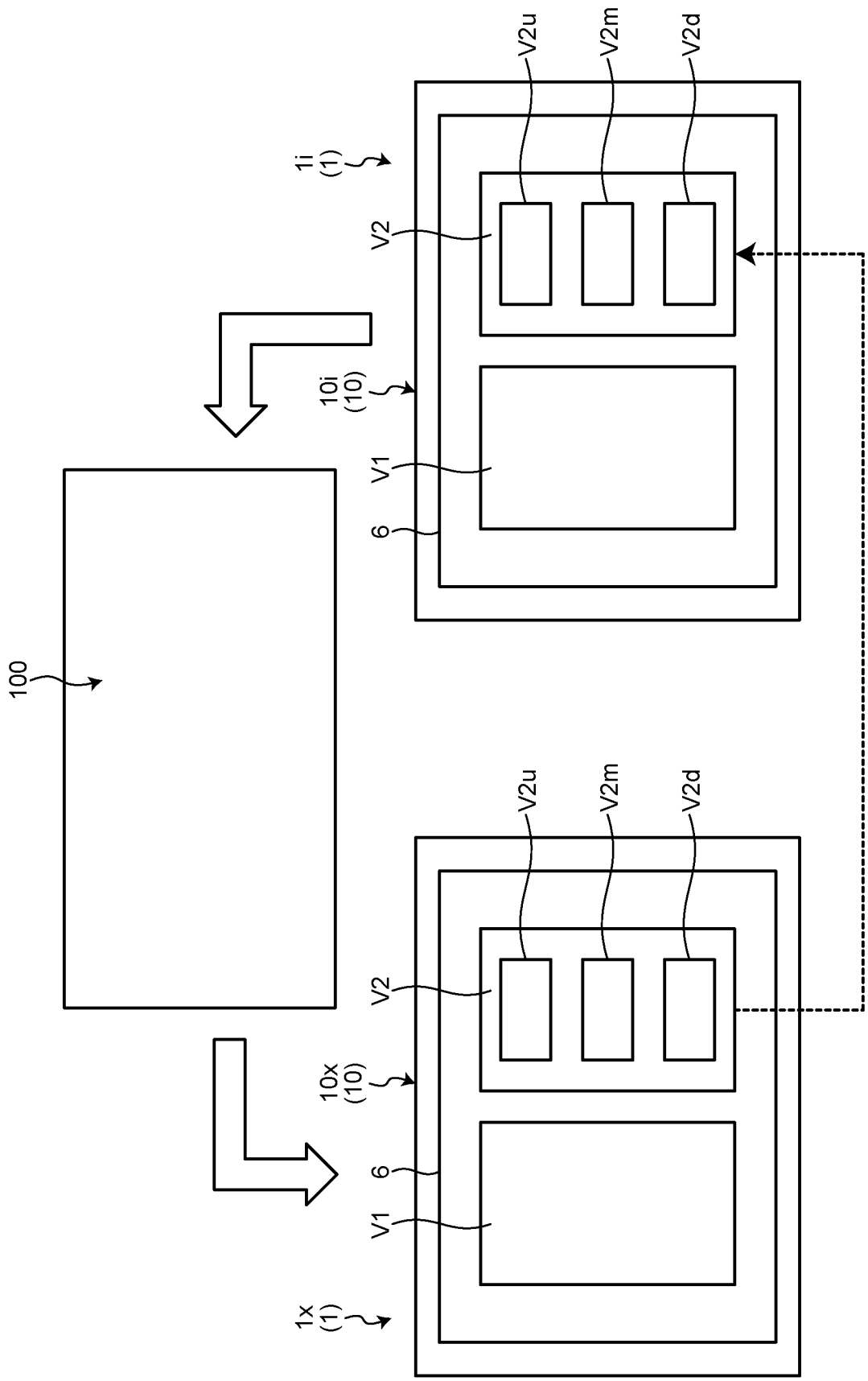
FIG. 13 is an explanatory diagram regarding replacement of an image display unit.

An embodiment is described with reference to FIGS. 1 to 13. This embodiment relates to a method of adjusting a vehicle display device, and a vehicle display device. FIG. 1 is a diagram illustrating the vehicle display device according to the embodiment, FIG. 2 is an explanatory diagram regarding positional displacement in an image horizontal direction, FIGS. 3 and 5 are explanatory diagrams of a first adjusting process of the embodiment, FIG. 4 is a flowchart regarding an adjusting process of the embodiment, FIG. 6 is an explanatory diagram of a second adjusting process of the embodiment, FIG. 7 is an explanatory diagram of a first correction value and a second correction value of the embodiment, and FIGS. 8 to 10 are diagrams illustrating a display area of the embodiment. FIGS. 11 and 12 are explanatory diagrams regarding adjustment of a display position, and FIG. 13 is an explanatory diagram regarding replacement of an image display unit.

As illustrated in FIG. 1, a vehicle display device 1 according to this embodiment is a head-up display device mounted on a vehicle 100 such as an automobile. The vehicle display device 1 projects display light Lt of an image toward a windshield 110. The windshield 110 is located on an anterior part of the vehicle with respect to an eye point EP of the vehicle 100 and faces the eye point EP in a vehicle front-rear direction X. The display light Lt is reflected by a reflecting surface 110a of the windshield 110 toward the eye point EP. A driver of the vehicle 100 can visually recognize a virtual image Vi by the display light Lt.

The vehicle display device 1 of this embodiment can change a projection position of an image on the windshield 110 in a vertical direction. The vehicle display device 1 moves the projection position of the image with respect to the windshield 110 up and down according to a position of the eye point EP. The eye point EP is a position of a driver's eye, which is detected using, for example, a camera 11 of the vehicle display device 1. The illustrated camera 11 is arranged on the anterior part of the vehicle with respect to a driver's seat and is installed so as to be able to image the driver. The eye point EP is detected by image recognition on an image generated by the camera 11.

The vehicle display device 1 includes an image display unit 10 mounted on the vehicle 100. The image display unit 10 includes a housing 2, a display device 3, a mirror 4, a controller 5, a nonvolatile memory 6, and a motor 7. The housing 2 is arranged inside an instrument panel, for example. The housing 2 includes an opening facing the windshield 110. The display device 3, the mirror 4, the controller 5, the nonvolatile memory 6, and the motor 7 are housed in housing 2.

The display device 3 is a device that displays an image, and is, for example, a liquid crystal display device. The display device 3 may be a thin film transistor-liquid crystal display (TFT-LCD). The display device 3 outputs the display light Lt by light of a backlight unit, for example.

The mirror 4 reflects the display light Lt of the image toward the windshield 110. The display light Lt reflected by the mirror 4 passes through the opening of the housing 2 and is projected on the reflecting surface 110a of the windshield 110. The mirror 4 includes a reflecting surface 4a in a concave shape, and can enlarge an image. A shape of the reflecting surface 4a is, for example, a free-form surface. The shape of the reflecting surface 4a may be a shape that corrects image distortion and aberration.

The image display unit 10 of this embodiment includes the motor 7 that rotates the mirror 4. The mirror 4 is rotatably supported. A rotating direction of the mirror 4 is a direction of changing an inclination angle $\theta$ of the reflecting surface 4a with respect to a vehicle vertical direction Z as indicated by arrow AR1 in FIG. 1. When the inclination angle $\theta$ of the mirror 4 becomes large, the projection position of the image on the windshield 110 moves downward. In contrast, when the inclination angle $\theta$ of the mirror 4 becomes smaller, the projection position of the image on the windshield 110 moves upward.

The motor 7 rotates the mirror 4 to adjust the inclination angle $\theta$ of the reflecting surface 4a to a desired angle. The motor 7 is, for example, a stepping motor. The motor 7 is driven by a command value output by the controller 5. The command value includes the rotating direction and the number of steps of the motor 7.

The controller 5 controls the display device 3 and the motor 7. The controller 5 is a computer including, for example, an arithmetic unit, a memory, a communication interface and the like. The controller 5 controls the motor 7, for example, according to a program stored in advance. The controller 5 controls the display device 3 on the basis of a program stored in advance and a first correction value and a second correction value read from the nonvolatile memory 6.

The controller 5 of this embodiment automatically adjusts the projection position of the image on the basis of the position of the eye point EP. The detection of the eye point EP based on an imaging result of the camera 11 may be executed by the controller 5 or may be executed by another processing unit. Note that, the controller 5 can also change the projection position of the image by an external command. For example, the controller 5 can change the projection position according to an operation input of the driver, or can change the projection position according to a command from an inspection apparatus.

The controller 5 determines a target value of the inclination angle $\theta$ of the mirror 4 according to the position of the eye point EP in the vehicle vertical direction Z. FIG. 1 illustrates an upper end position EPu, a central position EPm, and a lower end position EPd of the eye point EP. The upper end position EPu, the central position EPm, and the lower end position EPd are, for example, an upper end position, a central position, and a lower end position in the vehicle vertical direction Z of an eye box or an eyellipse.

In a case where the position of the eye point EP is the central position EPm, the controller 5 sets the target value of the inclination angle $\theta$ of the mirror 4 to a central value of a movable range. In this case, the image is projected on a position 110m of the windshield 110. The position 110m is a central position in the vertical direction in the projection range of the image.

In a case where the position of the eye point EP is the upper end position EPu, the controller 5 sets the target value of the inclination angle θ of the mirror 4 to a minimum value. In this case, the image is projected on a position 110u of the windshield 110. The position 110u is an upper end position in the projection range of the image. In a case where the position of the eye point EP is the lower end position EPd, the controller 5 sets the target value of the inclination angle θ of the mirror 4 to a maximum value. In this case, the image is projected on a position 110d of the windshield 110. The position 110d is a lower end position in the projection range of the image.

Here, in a case where the projection position of the image with respect to the windshield 110 is changed vertically, the position of the image might be displaced in an image horizontal direction GH. FIG. 2 illustrates the displacement of the display position in the image horizontal direction GH. In FIG. 2, a regular position Hr is a regular display position in the image horizontal direction GH. In other words, the regular position Hr is a target position of an image center in the projected image.

FIG. 2 illustrates images G1, G2, and G3. The image G1 is an image projected on the position 110u and visually recognized from the upper end position EPu. The image G2 is an image projected on the position 110m and visually recognized from the central position EPm. The image G3 is an image projected on the position 110d and visually recognized from the lower end position EPd.

In FIG. 2, an image center C2 of the image G2 is located in the regular position Hr. An image center C1 of the image G1 is displaced leftward from the regular position Hr as seen from the eye point EP. In contrast, an image center C3 of the image G3 is displaced rightward from the regular position Hr as seen from the eye point EP. Such positional displacement includes positional displacement due to tolerance of each unit in the image display unit 10 and positional displacement due to tolerance on the vehicle 100 side.

The controller 5 of this embodiment corrects the display position in the image horizontal direction GH on the display device 3 on the basis of the first correction value and the second correction value to be described later. The first correction value is a correction value based on an inspection result for the image display unit 10 alone not mounted on the vehicle 100. By the correction of the display position by the first correction value, the positional displacement in the image horizontal direction GH caused by the image display unit 10 is canceled. The second correction value is a correction value based on an inspection result for the image display unit 10 mounted on the vehicle 100. By the correction of the display position by the second correction value, the positional displacement in the image horizontal direction GH caused by the vehicle 100 is canceled.

The vehicle display device 1 of this embodiment independently stores the first correction value and the second correction value as different correction values in the nonvolatile memory 6. Accordingly, as described below, the positional displacement in the image horizontal direction GH with respect to the vehicle display device 1 can be efficiently adjusted. For example, adjusting work when the image display unit 10 is installed in the vehicle 100 is facilitated. In addition, adjusting work when the image display unit 10 is replaced is facilitated.

First, a process of calculating the first correction value is described. In the following description, a process of calculating the first correction value and writing the same in the nonvolatile memory 6 is referred to as a first adjusting process. In the first adjusting process, the first correction value is calculated by a first inspection described below.

As illustrated in FIG. 3, the first adjusting process is performed using the inspection apparatus including a windshield 200 for inspection, a target board 210, an inspection table 220, a camera 230, and a control device 240. The first adjusting process is performed, for example, in a factory in which the image display unit 10 is manufactured. The inspection table 220 is a table imitating a mounting position of the image display unit 10 in the vehicle 100. The windshield 200 includes a reflecting surface 200a formed similarly to the windshield 110 of the vehicle 100. A positional relationship between the inspection table 220 and the windshield 200 is set in such a manner that a positional relationship between the image display unit 10 mounted on the vehicle 100 and the windshield 110 can be reproduced.

The camera 230 captures an image as seen from the eye point EP. The camera 230 includes three cameras 230u, 230m, and 230d. The camera 230u is arranged so as to be able to capture an image similar to that as seen from the upper end position EPu of the vehicle 100. Similarly, the cameras 230m and 230d are arranged so as to be able to capture images similar to those as seen from the central position EPm and the lower end position EPd of the vehicle 100.

The target board 210 is referred to for detecting the displacement of the image with respect to the regular position Hr. The target board 210 is arranged on the side opposite to the camera 230 with respect to the windshield 200. A position of the target board 210 is, for example, a position serving as a background of the image as seen from the camera 230.

The control device 240 controls the image display unit 10 and the camera 230. The control device 240 sends a command to the controller 5 of the image display unit 10 to control the inclination angle θ of the mirror 4 and the image display by the display device 3. The control device 240 controls the camera 230 to acquire an inspection image captured by the camera 230.

An operation in the first adjusting process is described with reference to FIG. 4. At Step S10, the control device 240 instructs the controller 5 to move a virtual image up and down. For example, the control device 240 instructs the controller 5 to set the inclination angle θ of the mirror 4 to an angle corresponding to the upper end position EPu, an angle corresponding to the central position EPm, or an angle corresponding to the lower end position EPd.

FIG. 3 illustrates a state in which the inclination angle θ of the mirror 4 is set to the angle corresponding to the central position EPm. In this state, positional displacement of the image G2 as seen from the central position EPm is inspected. The display light Lt of the image is projected on a position 200m of the windshield 200. The position 200m is a position corresponds to the position 110m of the windshield 110.

At next Step S20, the control device 240 measures a displacement amount. The control device 240 allows the camera 230m to capture the image projected on the position 200m. The target board 210 serving as the background of the image includes a mark 210r and a frame 210m. The mark 210r is a mark corresponding to the regular position Hr. The illustrated mark 210r is a straight line extending in an image vertical direction GV. The frame 210m is a frame-shaped mark indicating a regular display position of the image G2.

The camera 230m captures the image G2 and the target board 210. The presence or absence of the positional displacement of the image G2 with respect to the mark 210r and the frame 210m in the image horizontal direction GH is detected on the basis of the captured inspection image. The presence or absence of the positional displacement and an amount of the positional displacement are determined by the control device 240, for example. In this case, the control device 240 detects the image center C2 of the image G2, the mark 210r, and the frame 210m by image recognition on the inspection image acquired from the camera 230m. The control device 240 calculates the amount of the positional displacement of the image G2 with respect to the mark 210r and the frame 210m in the image horizontal direction GH.

At next Step S30, the control device 240 determines whether an amount of horizontal displacement is within the standard. A certain allowable range is defined for the horizontal displacement of the image. As a result of the determination at Step S30, in a case where the displacement amount detected at Step S20 is a value within the standard, affirmative determination is made, and the processing proceeds to Step S40. In contrast, in a case where negative determination is made at Step S30, the processing proceeds to Step S50.

At Step S40, the control device 240 moves the position of the virtual image to a prescribed position. The prescribed position is, for example, a position corresponding to the central position EPm. When Step S40 is executed, this flowchart temporarily ends. The flowchart in FIG. 4 is repeatedly executed until the inspection of the horizontal displacement for all the projection positions to be inspected is finished.

At Step S50, the control device 240 calculates a correction amount. The control device 240 calculates the first correction value on the basis of the displacement amount in the image horizontal direction GH measured at Step S20. The first correction value is determined so as to reduce the positional displacement in the image horizontal direction GH by correcting the display position by the first correction value in the display device 3. Magnitude of the first correction value is determined in advance according to magnitude of the detected positional displacement, for example. For example, the larger the detected positional displacement, the larger the first correction value. When Step S50 is executed, the processing proceeds to Step S60.

At Step S60, the control device 240 writes the correction amount. The control device 240 writes the first correction value calculated at Step S50 in the nonvolatile memory 6 of the image display unit 10. Note that, the controller 5 may temporarily store the first correction value in the internal memory until the first correction value is fixed. When Step S60 is executed, the processing proceeds to Step S10.

In the flowchart in FIG. 4, the calculation and writing of the first correction value are repeated until the amount of the horizontal displacement reaches a value within the standard. For example, in the course of adjustment of the first correction value for the image G2, when the processing proceeds from Step S60 to Step S10, the projection position of the image is set to the position 110m again. At Step S20, the displacement amount is measured on the basis of an imaging result of the camera 230m, and it is confirmed at Step S30 whether the displacement amount is the value within the standard.

In a case where the measured amount of the horizontal displacement is not the value within the standard, the first correction value is calculated at Step S50. In this case, adjustment for reducing the amount of the horizontal displacement is made with respect to the current first correction value. At Step S60, the adjusted first correction value is written in the nonvolatile memory 6. When the displacement amount finally reaches the value within the standard, the processing proceeds to Step S40, and the setting of the first correction value for the image G2 is completed.

FIG. 5 illustrates an inspection for detecting the displacement of the image G1 as seen from the upper end position EPu. The inclination angle θ of the mirror 4 at that time is the angle corresponding to the upper end position EPu. Therefore, the display light Lt of the image is projected on a position 200u of the windshield 200. The position 200u is a position corresponding to the position 110u of the windshield 110. The target board 210 includes a frame 210u indicating a regular display position of the image G1. The camera 230u captures an image projected on the position 200u. That is, the camera 230u captures the image G1 and the target board 210.

The presence or absence of positional displacement of the image G1 with respect to the mark 210r and the frame 210u in the image horizontal direction GH is detected on the basis of the captured inspection image. The control device 240 detects the image center C1 of the image G1, the mark 210r, and the frame 210u by image recognition on the inspection image. The control device 240 calculates the amount of the positional displacement of the image G1 with respect to the mark 210r and the frame 210u in the image horizontal direction GH. In a case where the displacement amount is a value outside the standard, the control device 240 calculates the first correction value for the upper end position EPu and writes the same in the nonvolatile memory 6.

The presence or absence of the positional displacement of the image G3 and an amount of the positional displacement are similarly detected. In this case, the inclination angle θ of the mirror 4 is set to the angle corresponding to the lower end position EPd. The target board 210 includes a frame-shaped mark indicating a regular display position of the image G3. The control device 240 calculates the amount of the positional displacement of the image G3 with respect to the mark 210r and the frame-shaped mark in the image horizontal direction GH. In a case where the displacement amount is a value outside the standard, the control device 240 calculates the first correction value for the lower end position EPd and writes the same in the nonvolatile memory 6.

Note that, the presence or absence of the positional displacement and the amount of the positional displacement may be visually confirmed by the operator. In this case, the image projected by the display device 3 is preferably an image the center of which can be visually confirmed by the operator. The operator inputs the presence or absence of the positional displacement and the amount of the positional displacement in the control device 240. The control device 240 calculates the first correction value from the input amount of the positional displacement, and writes the first correction value in the nonvolatile memory 6.

In this embodiment, the first correction value is calculated for each of at least the upper end position EPu, the central position EPm, and the lower end position EPd. For the eye point EP with which the amount of the horizontal displacement is within the standard, the value of the first correction value may be set to 0.

In a case where the first correction value is stored in the nonvolatile memory 6, the controller 5 corrects the display position in the image horizontal direction GH on the display device 3 on the basis of the first correction value. Accordingly, in a case where the image display unit 10 projects an image on the windshield 200, the image is projected in the regular position Hr of the windshield 200. That is, by the first correction value, the positional displacement in the image horizontal direction GH caused by the image display unit 10 is canceled.

Next, a process of calculating the second correction value is described. In the following description, a process of calculating the second correction value and writing the same in the nonvolatile memory 6 is referred to as a second adjusting process. In the second adjusting process, the second correction value is calculated by a second inspection described below. The second adjusting process is executed after the first adjusting process.

As illustrated in FIG. 6, the second adjusting process is performed while installing the image display unit 10 in the vehicle 100. The second adjusting process is performed, for example, in a factory in which the image display unit 10 is mounted on the vehicle 100. The image display unit 10 illustrated in FIG. 6 is assembled to the vehicle 100 and fixed to the vehicle 100. In the second inspection, a camera 130 is installed in the vehicle 100. The camera 130 is installed, for example, in the driver's seat of the vehicle 100.

The camera 130 includes three cameras 130u, 130m, and 130d. The camera 130u is arranged so as to be able to capture an image similar to that as seen from the upper end position EPu of the vehicle 100. Similarly, the cameras 130m and 130d are arranged so as to be able to capture images similar to those as seen from the central position EPm and the lower end position EPd of the vehicle 100.

In the second inspection, for example, the target board 210 and the control device 240 are used similarly to the first inspection. The target board 210 is arranged on the side opposite to the camera 130 with respect to the windshield 110. A position of the target board 210 is, for example, a position serving as a background of the image as seen from the camera 130.

The control device 240 is communicably connected to the image display unit 10 and the camera 130. The control device 240 executes processing according to the flowchart in FIG. 4. Note that, at Step S50 of the second adjusting process, the second correction value is calculated, and at Step S60, the second correction value is written in the nonvolatile memory 6.

FIG. 6 illustrates an inspection for detecting the displacement of the image G2 as seen from the central position EPm. The inclination angle θ of the mirror 4 at that time is the angle corresponding to the central position EPm. Therefore, the display light Lt of the image is projected on the position 110m of the windshield 110. The controller 5 allows the display device 3 to display the image subjected to position correction by the first correction value. That is, the image display position on the display device 3 in the second inspection is a position after an error in the image horizontal direction GH caused by the image display unit 10 is corrected. The camera 130m captures an image projected on the position 110m.

The camera 130m captures the image G2 and the target board 210. The presence or absence of the positional displacement of the image G2 with respect to the mark 210r and the frame 210m in the image horizontal direction GH is detected on the basis of the captured inspection image. The presence or absence of the positional displacement and an amount of the positional displacement are determined by the control device 240. The control device 240 detects the image center C2 of the image G2, the mark 210r, and the frame 210m by image recognition on the inspection image. The control device 240 calculates the amount of the positional displacement of the image G2 with respect to the mark 210r and the frame 210m in the image horizontal direction GH. The positional displacement herein detected is mainly caused by the vehicle 100.

In a case where the amount of the positional displacement is a value outside the standard, the control device 240 calculates the second correction value and writes the second correction value in the nonvolatile memory 6 of the image display unit 10. The second correction value is determined in advance according to the magnitude of the detected positional displacement, for example. The second correction value is a correction value for reducing the positional displacement in the image horizontal direction GH caused by the vehicle 100.

In the second adjusting process, the calculation of the second correction value is repeated until the detected amount of the horizontal displacement reaches a value within the standard. For example, in the course of adjustment of the second correction value for the image G2, when the processing proceeds from Step S60 to Step S10, the projection position of the image is set to the position 110m again. The image G2 the display position of which is adjusted by the second correction value is projected on the position 110m, and a positional displacement in the image horizontal direction GH with respect to the mark 210r and the frame 210m is detected at Step S20. When the displacement amount is determined to be not a value within the standard at Step S30, the second correction value is calculated at Step S50. In this case, adjustment for reducing the amount of the horizontal displacement is made with respect to the current second correction value. At Step S60, the adjusted second correction value is written in the nonvolatile memory 6. When the displacement amount finally reaches the value within the standard, the processing proceeds to Step S40, and the setting of the second correction value for the image G2 is completed.

Similar inspection and calculation of the second correction value are performed for the displacement of the image G1 as seen from the upper end position EPu and the displacement of the image G3 as seen from the lower end position EPd. The control device 240 calculates the amount of the positional displacement of the image G1 with respect to the mark 210r and the frame 210u in the image horizontal direction GH. Similarly, the control device 240 calculates the amount of the displacement from the regular position of the image G3 in the image horizontal direction GH. The control device 240 calculates the second correction value on the basis of the detected amount of the positional displacement, and writes the same in the nonvolatile memory 6.

Note that, the presence or absence of the positional displacement and the amount of the positional displacement may be visually confirmed by the operator. In this case, the image projected by the display device 3 is preferably an image the center of which can be visually confirmed by the operator. The operator inputs the presence or absence of the positional displacement and the amount of the positional displacement in the control device 240. The control device 240 calculates the second correction value from the input amount of the positional displacement, and writes the second correction value in the nonvolatile memory 6.

The correction of the display position of the image is described with reference to FIGS. 7 and 8. The nonvolatile memory 6 is provided outside the controller 5, for example, as illustrated in FIG. 7. The nonvolatile memory 6 is, for example, an EEPROM. A first correction value V1 and a second correction value V2 are written in the nonvolatile memory 6. The nonvolatile memory 6 may be provided with a storage area for the first correction value V1 and a dedicated storage area for the second correction value V2.

The first correction value V1 and the second correction value V2 of this embodiment are the number of pixels in the image horizontal direction GH in the display device 3. The first correction value V1 includes a correction value V1$u$ corresponding to the upper end position EPu, a correction value V1$m$ corresponding to the central position EPm, and a correction value V1$d$ corresponding to the lower end position EPd. The second correction value V2 includes a correction value V2$u$ corresponding to the upper end position EPu, a correction value V2$m$ corresponding to the central position EPm, and a correction value V2$d$ corresponding to the lower end position EPd.

The controller 5 calculates a total correction value VT from the first correction value V1 and the second correction value V2. The total correction value VT is, for example, a total value obtained by adding the first correction value V1 and the second correction value V2. The total correction value VT includes a correction value VTu corresponding to the upper end position EPu, a correction value VTm corresponding to the central position EPm, and a correction value VTd corresponding to the lower end position EPd.

The correction of the display position on the display device 3 is described. FIG. 8 illustrates a display surface 3$a$ of the display device 3. On the display surface 3$a$, a display area 31 is set according to the position of the eye point EP. A shape of the display area 31 is determined on the basis of distortion occurring in an optical system from the display surface 3$a$ to the eye point EP. The shape of the display area 31 is set in such a manner that, for example, an image area reflected by the windshield 110 toward the eye point EP is rectangular. The display area 31 has a center point 31$c$.

A display area 31$u$ illustrated in FIG. 8 is the display area 31 corresponding to the upper end position EPu. That is, in a case where the position of the eye point EP is the upper end position EPu, the display device 3 displays an image in the display area 31$u$.

A reference position Hc in the image horizontal direction GH is determined on the display surface 3$a$. The image display unit 10 is designed in such a manner that the reference position Hc corresponds to the regular position Hr of the image display. In other words, the image display unit 10 is designed in such a manner that the pixel in the reference position Hc is displayed in the regular position Hr in a case where there is no individual difference.

The controller 5 determines the position of the display area 31$u$ on the display surface 3$a$ on the basis of the first correction value V1 and the second correction value V2. More specifically, the controller 5 moves the center point 31$c$ of the display area 31$u$ in the image horizontal direction GH as indicated by arrow AR2 according to the total correction value VTu with respect to the upper end position EPu. The number of pixels between the moved center point 31$c$ and the reference position Hc is equal to a value of the total correction value VTu.

A display area 31$m$ illustrated in FIG. 9 is the display area 31 corresponding to the central position EPm. That is, in a case where the position of the eye point EP is the central position EPm, the display device 3 displays an image in the display area 31$m$. In a case where the value of the total correction value VT is 0, the position of the display area 31 is set to an initial position. FIG. 9 illustrates the display area 31$m$ in a case where the total correction value VTm with respect to the central position EPm is 0. In this case, the position of the center point 31$c$ in the image horizontal direction GH is the reference position Hc.

A display area 31$d$ illustrated in FIG. 10 is the display area 31 corresponding to the lower end position EPd. That is, in a case where the position of the eye point EP is the lower end position EPd, the display device 3 displays an image in the display area 31$d$.

The controller 5 determines the position of the display area 31$d$ on the display surface 3$a$ on the basis of the first correction value V1 and the second correction value V2. More specifically, the controller 5 moves the center point 31$c$ of the display area 31$d$ in the image horizontal direction GH as indicated by arrow AR3 according to the total correction value VTd with respect to the lower end position EPd. The number of pixels between the moved center point 31$c$ and the reference position Hc is equal to a value of the total correction value VTd.

Note that, a moving direction indicated by arrow AR3 in FIG. 10 is opposite to a moving direction indicated by arrow AR2 in FIG. 8. That is, the first correction value V1 and the second correction value V2 are values having the number of pixels and a moving direction. For example, the correction value in the direction of arrow AR2 is a positive value, and the correction value in the direction of arrow AR3 is a negative value.

In a case where the position of the eye point EP is a position different from any of the upper end position EPu, the central position EPm, and the lower end position EPd, the controller 5 of this embodiment calculates the total correction value VT by linear interpolation. FIG. 11 illustrates a position EPb of the detected eye point EP. The position EPb is a position between the central position EPm and the upper end position EPu. A position 110$b$ of the windshield 110 is a projection position corresponding to the position EPb of the eye point EP.

FIG. 12 is a diagram illustrating linear interpolation in a case where the position of the eye point EP is EPb. A display area 31$b$ illustrated in the center of FIG. 12 is the display area 31 corresponding to the position EPb of the eye point EP.

The display area 31$m$ illustrated in a lower part of FIG. 12 is the display area 31 corresponding to the central position EPm of the eye point EP. The display area 31$u$ illustrated in an upper part of FIG. 12 is the display area 31 corresponding to the upper end position EPu of the eye point EP. In the example illustrated in FIG. 12, the total correction value VTm of the display area 31$m$ is 0, and the total correction value VTu that is not 0 is set in display area 31$u$.

The numbers of Steps STu and STb of the motor 7 are illustrated on a left side of FIG. 12. The number of Steps STu is the number of steps of the motor 7 when the projection position is moved from the position 110$m$ to the position 110$u$ of the windshield 110. The number of Steps STb is the number of steps of the motor 7 when the projection position is moved from the position 110$m$ to the position 110$b$ of the windshield 110.

In this case, the total correction value VTb of the display area 31$b$ corresponding to the position EPb is calculated by following equation (1).

$$VTb=VTu \times STb/STu \qquad (1)$$

In a case where the position EPb of the eye point EP is located between the central position EPm and the lower end position EPd, the total correction value VTb is calculated by following equation (2). Note that, the number of Steps STd is the number of steps of the motor 7 when the projection position is moved from the position 110$m$ to the position 110$d$ of the windshield 110.

$$VTb=VTd \times STb/STd \qquad (2)$$

According to the method of adjusting the vehicle display device according to this embodiment, the first correction value V1 for correcting an error unique to the image display unit 10 is calculated in the first adjusting process. In the second adjusting process, the second correction value V2 for correcting an error unique to the vehicle 100 is calculated. By separately calculating the two correction values V1 and V2 in this manner, the positional displacement in the image horizontal direction GH can be efficiently adjusted.

As a comparative example to this embodiment, a method of adjusting all errors after the image display unit 10 is mounted on the vehicle 100 is considered. In this case, there is a case where the error of the image display unit 10 and the error of the vehicle 100 are accumulated, and large positional displacement occurs. As a result, the number of times of adjustment of the positional displacement increases, which tends to lower efficiency.

In contrast, according to the method of adjusting the vehicle display device according to this embodiment, the number of times of adjustment in the first adjusting process and the second adjusting process is reduced, and the efficiency of each adjusting process is improved. In the method of adjusting the vehicle display device according to this embodiment, the positional displacement of the image is corrected by the adjustment of the display position in the display device 3. Accordingly, the efficiency is improved as compared with a method of reducing the positional displacement of the image by mechanical adjustment such as changing the position or angle of the component or changing an installation manner of the housing 2.

According to the vehicle display device 1 of this embodiment, as described below, the adjusting work when the image display unit 10 is replaced is made efficient. FIG. 13 is a diagram illustrating data transfer at the time of replacement of the image display unit 10. In FIG. 13, a vehicle display device 1x is the vehicle display device 1 to be removed from the vehicle 100 due to a failure or the like, and an image display unit 10x is the image display unit 10 of the vehicle display device 1x to be removed. A vehicle display device 1i is the vehicle display device 1 to be newly attached to the vehicle 100, and an image display unit 10i is the image display unit 10 of the new vehicle display device 1i. The first adjusting process is executed in the image display unit 10i, and the first correction value V1 is written in the nonvolatile memory 6.

The second correction value V2 of the image display unit 10x to be removed is transferred to the new image display unit 10i to be attached. A transfer work of the second correction value V2 is executed using, for example, a service tool. In this case, the service tool reads the second correction value V2 from the image display unit 10x to be removed, and writes the same in the nonvolatile memory 6 of the new image display unit 10i. The controller 5 of the image display unit 10i adds the first correction value V1 unique to the image display unit 10i and the transferred second correction value V2 to calculate the total correction value VT.

The second adjusting process is executed on the image display unit 10i installed in the vehicle 100. In the second adjusting process, the positional displacement of the images G1, G2, and G3 is detected by the second inspection. The display position of the image on the display device 3 at that time is corrected on the basis of the transferred second correction value V2. In other words, the display device 3 of the new image display unit 10 displays the image in which the display position is corrected with the transferred second correction value V2.

Therefore, even if the positional displacement of the image occurs in the second inspection, this does not tend to be significant. In a case where the detected amount of the positional displacement is a value outside the standard, the values of the second correction values V2u, V2m, and V2d are changed. For example, in a case where the positional displacement outside the allowable range occurs in the image G1 in the upper end position EPu, the second correction value V2u is adjusted so as to reduce the positional displacement, and the adjusted second correction value V2u is written in the nonvolatile memory 6.

According to the second adjusting process as described above, the adjusting work on the vehicle display device 1 is made efficient. For example, the display positions of the images G1, G2, and G3 displayed first in the second adjusting process are corrected with the transferred second correction value V2. Therefore, a work time until the second correction value V2 is adjusted to an appropriate value is shortened as compared with a case of adjusting the image display unit 10 in which the second correction value V2 remains at the initial value.

As described above, the method of adjusting the vehicle display device according to this embodiment includes the first adjusting process and the second adjusting process. The vehicle display device 1 can change the projection position of the image on the windshields 110 and 200 in the vertical direction. The first adjusting process is a process of calculating the first correction value V1 by performing the first inspection on the vehicle display device 1 and writing the first correction value V1 in the nonvolatile memory 6 of the vehicle display device 1. The second adjusting process is a process of calculating the second correction value V2 by performing the second inspection on the vehicle display device 1 and writing the second correction value V2 in the nonvolatile memory 6 of the vehicle display device 1. The first inspection and the second inspection correspond to, for example, Steps S10 to S50 in the flowchart. The procedure of writing the first correction value V1 and the second correction value V2 in the nonvolatile memory 6 corresponds to, for example, Step S60.

The first correction value V1 and the second correction value V2 are values that allows the display device 3 of the vehicle display device 1 to correct the display position in the image horizontal direction GH so as to reduce the positional displacement in the image horizontal direction GH with respect to the regular position Hr. In the first inspection, the vehicle display device 1 is installed on the inspection table 220 and projects an image on the windshield 200 for inspection. The first correction value V1 is calculated on the basis of the positional displacement in the image horizontal direction GH at the time of changing, in the vertical direction, the projection position of the image on the windshield 200 for inspection.

In the second inspection, the vehicle display device 1 is installed in the vehicle 100 and projects an image on the windshield 110 of the vehicle 100. The second correction value V2 is calculated on the basis of the positional displacement in the image horizontal direction GH at the time of changing, in the vertical direction, the projection position of the image on the windshield 110 of the vehicle 100. In the second inspection, the display device 3 displays the image in which the display position is corrected with the first correction value V1. In the method of adjusting the vehicle display device according to this embodiment, the first correction value V1 for correcting the positional displacement caused by the vehicle display device 1 is determined in the first adjusting process. In the second adjusting process, the second correction value V2 for correcting the positional displacement caused by the vehicle 100 is determined. The method of adjusting the vehicle display device according to this embodiment can efficiently adjust the positional displacement in the image horizontal direction by separately determining the correction values for the two positional displacements. For example, the adjustment of the positional displacement when mounted on the vehicle 100 is made efficient. In the second inspection, the image in which the display position is corrected with the first correction value V1 is displayed. Therefore, the method of adjusting the vehicle display device according to this embodiment can improve the work efficiency of the second adjusting process.

In the method of adjusting the vehicle display device according to this embodiment, in a case where the vehicle display device 1 is replaced in the vehicle 100, the second correction value V2 of the vehicle display device 1 removed from the vehicle 100 is transferred to the nonvolatile memory 6 of the new vehicle display device 1 attached to the vehicle 100. The display device 3 of the new vehicle display device 1 displays the image in which the display position is corrected with the transferred second correction value V2 in the second inspection. Therefore, the second adjusting process for the new vehicle display device 1 is made efficient.

The vehicle display device 1 according to this embodiment includes the image display unit 10 that is mounted on the vehicle 100 and can change the projection position of the image on the windshield 110 in the vertical direction. The image display unit 10 includes the display device 3 that displays an image, the mirror 4 that reflects the display light Lt of the image toward the windshield 110, the nonvolatile memory 6 that stores the first correction value V1 and the second correction value V2, and the controller 5 that controls the display device 3. The controller 5 corrects the display position on the display device 3 in the image horizontal direction GH on the basis of the first correction value V1 and the second correction value V2 according to the projection position of the image on the windshield 110 in the vertical direction.

The first correction value V1 is a correction value based on the inspection result for the image display unit 10 alone not mounted on the vehicle 100. The second correction value V2 is a correction value based on the inspection result for the image display unit 10 mounted on the vehicle 100, and is based on the inspection result for the image display unit 10 in which the display position is corrected with the first correction value V1. The vehicle display device 1 according to this embodiment can efficiently adjust the positional displacement in the image horizontal direction by separately performing the inspection for the first correction value V1 and the inspection for the second correction value V2. For example, the adjustment of the positional displacement when mounted on the vehicle 100 is made efficient. The second correction value V2 is based on the inspection result for the image display unit 10 in which the display position is corrected with the first correction value V1. Therefore, the efficiency of the process of determining the second correction value V2 is improved.

Note that, the nonvolatile memory 6 may be a memory provided inside the controller 5. The nonvolatile memory 6 is not limited to the EEPROM, and may be, for example, a flash memory. The nonvolatile memory 6 in which the second correction value V2 is written may be a memory of a storage medium attachable to and detachable from the image display unit 10.

First Variation of Embodiment

Figure 14:
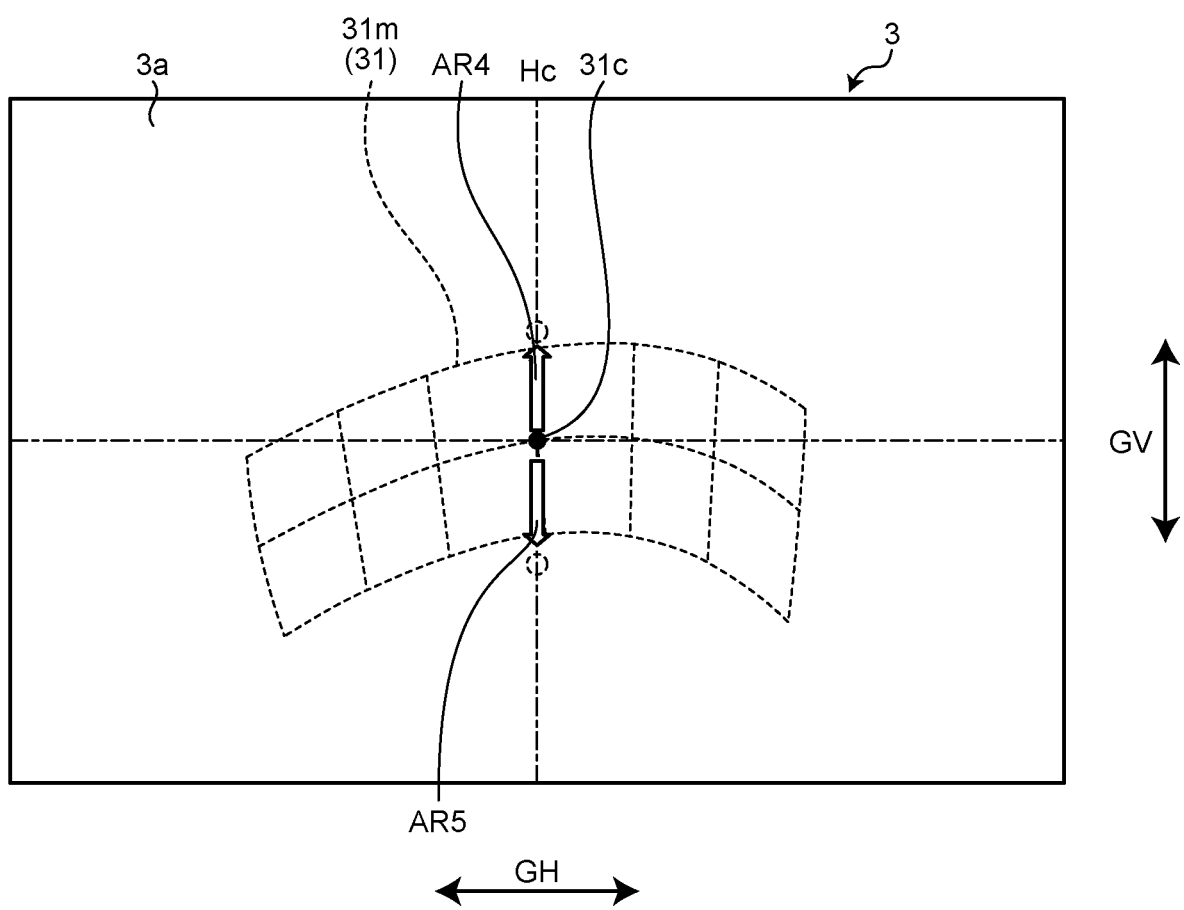
FIG. 14 is a diagram illustrating a display device according to a first variation of the embodiment.

A first variation of the embodiment is described. FIG. 14 is a diagram illustrating a display device according to the first variation of the embodiment. The first variation of the embodiment is different from the above-described embodiment in that, for example, the display position of the image on the display device 3 is changed in an image vertical direction GV.

FIG. 14 illustrates a display area 31m corresponding to a central position EPm of an eye point EP. The display device 3 changes a display area 31 in the image vertical direction GV according to a position of the eye point EP in the vehicle vertical direction Z. In a case where the position of the eye point EP is located above the central position EPm, the display device 3 changes a center point 31c of the display area 31 to an upper side of the image as indicated by arrow AR4. Accordingly, an image projection position on a windshield 110 is located above a position 110m.

In contrast, in a case where the position of the eye point EP is located below the central position EPm, the display device 3 changes the center point 31c of the display area 31 to a lower side of the image as indicated by arrow AR5. Accordingly, the image projection position on the windshield 110 is located below the position 110m.

The position of the display area 31 in the image vertical direction GV is designated by a controller 5, for example. The controller 5 further corrects the position of the display area 31 in an image horizontal direction GH on the basis of the first correction value V1 and the second correction value V2.

Note that, the image projection position in the vertical direction with respect to windshield 110 may be adjusted by both an inclination angle θ of a mirror 4 and a display position of the display device 3.

The contents disclosed in the embodiment and variation described above can be appropriately combined to be executed.

A method of adjusting a vehicle display device according to the present embodiment includes a process of calculating a first correction value by performing a first inspection on an inspection table and writing the same in a nonvolatile memory, and a process of calculating a second correction value by performing a second inspection in a vehicle and writing the same in a nonvolatile memory.

In the vehicle display device according to the present embodiment, a first correction value based on an inspection result for an image display unit alone not mounted on a vehicle and a second correction value based on an inspection result for the image display unit mounted on the vehicle are stored in the nonvolatile memory.

According to the method of adjusting the vehicle display device, and the vehicle display device according to the present embodiment, there is an effect of efficiently adjusting positional displacement in an image horizontal direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of adjusting a vehicle display device, the method comprising processes of:
   placing the vehicle display device on an inspection table, the vehicle display device is configured to change a projection position of an image in a vertical direction;
   projecting the image from the vehicle display device onto an inspection windshield;
   calculating a first correction value by performing a first inspection on the vehicle display while the display device is mounted on the inspection table and projecting the image on the inspection windshield, and writing the first correction value in a nonvolatile memory of the vehicle display device;

removing the vehicle display device from the inspection table;

installing the vehicle display device in a vehicle after removing the display device from the inspection table;

projecting the image from the vehicle display device onto a windshield of the vehicle, the windshield of the vehicle is different from the inspection windshield;

calculating a second correction value by performing a second inspection on the vehicle display device after the display device has been installed in the vehicle and while the display device is projecting the image on the windshield of the vehicle, and writing the second correction value in the nonvolatile memory of the vehicle display device, wherein the first correction value and the second correction value are values that allow a display device of the vehicle display device to correct a display position in an image horizontal direction in order to reduce positional displacement in the image horizontal direction from a regular position, in the first inspection, the first correction value is calculated on a basis of positional displacement in the image horizontal direction at a time of changing, in the vertical direction, the projection position of the image on the windshield for inspection, in the second inspection, the second correction value is calculated on a basis of positional displacement in the image horizontal direction at a time of changing, in the vertical direction, a projection position of the image on the windshield of the vehicle, and in the second inspection, the display device displays an image in which the display position is corrected with the first correction value.

2. The method of adjusting a vehicle display device according to claim 1, wherein in a case where the vehicle display device is replaced in the vehicle a new vehicle display device including a nonvolatile memory, obtaining the second correction value of the vehicle display device removed from the vehicle and transferring the second correction value to the nonvolatile memory of the new vehicle display device attached to the vehicle, and the display device of the new vehicle display device displays, in the second inspection, an image in which the display position is corrected with the transferred second correction value.

3. A vehicle display device comprising:

an image display unit mounted on a vehicle, the image display unit configured to change a projection position of an image on a windshield in a vertical direction, wherein the image display unit includes:
  a housing;
  a display device that displays an image and is mounted in the housing;
  a mirror that receives the image from the display device and reflects display light of the image toward the windshield, the mirror is movably mounted in housing to change a projection position of the image on the windshield;
  a motor connected to the mirror and configured to move the mirror relative to the housing;
  a nonvolatile memory that stores a first correction value and a second correction value; and
  a controller configured to control the display device and the motor, the controller is configured to cause the display device to correct a display position in an image horizontal direction on the display device on a basis of the first correction value and the second correction value according to the projection position in the vertical direction of the image on the windshield, the first correction value is a fixed correction value determined by an inspection result for the image display unit alone not mounted on the vehicle, and the second correction value is a fixed correction value determined by an inspection result for the image display unit mounted on the vehicle, and after the display position is corrected with the first correction value.

* * * * *